United States Patent
Van Den Burg et al.

(10) Patent No.: US 6,428,832 B2
(45) Date of Patent: *Aug. 6, 2002

(54) LATE ADDITION OF PUFA IN INFANT FORMULA PREPARATION PROCESS

(75) Inventors: Anthonius Cornelis Van Den Burg, Rijswijk; Jan Willem Groenendaal, Delft, both of (NL)

(73) Assignee: DSM N.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/824,883

(22) Filed: Mar. 18, 1997

Related U.S. Application Data

(60) Provisional application No. 60/015,087, filed on Apr. 10, 1996.

(30) Foreign Application Priority Data

Mar. 26, 1996 (EP) .............................. 96200815

(51) Int. Cl.⁷ ................................. A23D 9/00
(52) U.S. Cl. ...................... 426/302; 426/443; 426/601; 426/602; 426/800; 426/801
(58) Field of Search ................. 426/601, 602, 426/588, 443, 800, 801, 302

(56) References Cited

U.S. PATENT DOCUMENTS

| | | | | |
|---|---|---|---|---|
| 4,753,926 A | * | 6/1988 | Lucas | 426/2 |
| 5,013,569 A | * | 5/1991 | Ruben | 426/585 |
| 5,374,657 A | * | 12/1994 | Kyle | 514/547 |
| 5,397,591 A | * | 3/1995 | Kyle | 426/602 |
| 5,518,753 A | * | 5/1996 | Bracco | 426/601 |
| 5,583,019 A | * | 12/1996 | Barclay | 435/134 |
| 5,658,767 A | * | 8/1997 | Kyle | 435/434 |
| 5,686,491 A | * | 11/1997 | Sherwood | 514/561 |
| 5,709,888 A | * | 1/1998 | Gil | 424/522 |

FOREIGN PATENT DOCUMENTS

| | | | |
|---|---|---|---|
| CH | | 456010 | 8/1966 |
| CH | | 0639333 | * 2/1995 |
| DE | | 27 00 817 | 1/1977 |
| EP | | 0 639 333 A1 | 8/1993 |
| FR | | 1390268 | 12/1963 |
| GB | | 1045704 | 12/1963 |
| GB | | 1164462 | * 8/1966 |
| GB | | 1165320 | * 8/1966 |
| GB | | 1045704 | * 10/1966 |
| GB | | 134888 | * 4/1971 |
| GB | | 1 346 888 | 12/1972 |
| GB | | 1544304 | * 1/1976 |
| GB | | 1544304 | 1/1977 |
| GB | | 2140806 | * 12/1984 |
| WO | WO 88/02221 | | * 4/1988 |
| WO | WO 92/12711 | | * 8/1992 |
| WO | WO 92/13086 | | * 8/1992 |
| WO | WO 95/06414 | | * 3/1995 |
| WO | WO 97/35487 | | * 10/1997 |
| WO | WO 97/35488 | | * 10/1997 |

OTHER PUBLICATIONS

Data—JP 62079732–870413 Agency of Ind. Science & Technol; others; Osamu Suzuki; Milk Containing Added Triglyceride Containing Gamma–Linolenic Acid.

* cited by examiner

*Primary Examiner*—Carolyn Paden
(74) *Attorney, Agent, or Firm*—Morrison & Foerster LLP

(57) ABSTRACT

The present invention relates to a process for the preparation of a polyunsaturated fatty acid (PUFA)-containing food, such as an infant formula, where a composition comprising a PUFA is added at a late stage of the infant formula preparation process in this way, the PUFA's are minimally exposed to conditions during the process that induce degradation of the PUFA's.

12 Claims, No Drawings

LATE ADDITION OF PUFA IN INFANT FORMULA PREPARATION PROCESS

This application claims priority from provisional application Ser. No. 60/015,087, filed Apr. 10, 1996.

FIELD OF THE INVENTION

The present invention relates to the field of nutrition, especially the field of infant nutrition. In particular, it relates to foods containing at least one polyunsaturated fatty acid (PUFA), such as an infant formula.

BACKGROUND OF THE INVENTION

Recently, the importance of the addition of polyunsaturated fatty acids (PUFA's) to infant formulas has been acknowledged (see for instance U.S. Pat. No. 4,670,285 and European Patent Publications EP-A-0231 904 and EP-A-0404056).

Infant formula is usually prepared by the following general process.

1. Pasteurised milk (skimmed, evaporated or whole milk) is standardised by the addition of whey protein concentrate, minerals, water-soluble vitamins, trace elements and carbohydrates at, high temperatures, for example 60° C.
2. Vegetable oil, oil-soluble emulsifiers, oil-soluble vitamins and anti-oxidants are mixed at high temperatures, for example 60° C.
3. The oil mixture obtained from 2 (an oil phase) is added to the standardised milk obtained from 1 (a water phase) with sufficient agitation to allow mixing.
4. The mixture obtained in 3 is homogenised in two stages at high temperature and pressure, for example 60° C. at 150 and 30 bar.
5. The emulsion obtained under 4 is cooled to a low temperature, for example 5° C.
6. If desired, water-soluble vitamins, minerals and trace elements are added to the cooled emulsion.
7a. Emulsion 6 is sterilised in-line at ultra high temperature (UHT) and/or in appropriate containers to obtain a formula in the form of a sterile liquid; or
7b. Emulsion 6 is pasteurised and spray dried to give a spray dried powder which is filled into appropriate containers.
8. If desired, other dry ingredients, e.g. vitamins, minerals, trace elements, whey protein concentrate and carbohydrates can be added to the spray dried powder from 7b.

Thus at several points in the infant formula preparation process high temperatures and pressures are used, for example during the following process steps:

melting and blending fats it the oil phase (2)

dissolving oil soluble emulsifiers in the oil phase before homogenisation (2);

pasteurisation before homogenisation (in 4);

homogenisation (4);

sterilisation (7a);

pasteurisation, after homogenisation (7b); and/or spray drying, if performed (7b).

Typically, the PUFA's which are used for the supplementation of infant formula are in a triglyceride, phospholipid, fatty acid or fatty acid ester form and are oily liquids. The most convenient way to disperse PUFA-containing lipids homogeneously is by mixing them in with the oil phase before the homogenisation step. Thus, currently, the PUFA-containing lipid is added to the oil phase, because the PUFAs are usually contained in lipids which themselves are oils. This is much easier than trying to homogeneously disperse the PUFAs in the formula at a later stage, especially once the emulsion in (3) has been formed.

DESCRIPTION OF THE INVENTION

According to a first aspect of the present invention there is provided a process for the preparation of a foodstuff comprising a polyunsaturated fatty acid (PUFA), the process comprising:

a) providing an oil phase and an aqueous phase;

b) mixing the oil and aqueous phases to obtain an emulsion;

c) optionally, drying the emulsion to obtain a dried material; and d) adding at least one PUFA (to the dried material).

A second aspect of the present invention relates to a foodstuff prepared by the process of the first aspect.

It will thus be seen that in the invention the PUFA is added at a relatively late stage in the preparation of the foodstuff. The advantage of this is that the or each PUFA (there may be more than one) is minimally exposed to conditions which can cause degradation.

There are usually three main causes of degradation during a conventional foodstuff preparation process that contains a PUFA. These are heating, drying and homogenization. Heating can take place at a number of places during prior art preparative processes. This includes heating of the oil phase, as well as heating during homogenization and sterilisation, and of course pasteurisation. The process of the invention seeks to minimise the exposure of the PUFAs to these various steps in order to maximise the preservation of the PUFA, and therefore to minimise degradation. Thus, the invention at its broadest can be regarded as a process for producing a PUFA-containing foodstuff, where at least one PUFA in added at a stage after one or more potentially PUFA-degrading stage(s) have occurred. The PUFA may therefore be added after one or more heating and/or drying stages.

This is entirely contrary to conventional wisdom, where the (PUFA) has, until now, been added to the, starting oil blend, because of course the. PUFA itself is an oil (and therefore there is no phase separation problem). It can be particularly difficult to disperse the PUFA for example, after the emulsification in (b), and so previously foodstuff manufacturers have tended to add the PUFA at the oil blend stage.

In addition, for existing foodstuff manufacturers, if it is decided to supplement the previously (non-PUFA containing) foodstuff with a PUFA, then this can easily be accomplished by adding the PUFA to the oil phase in (a). The reason for this in that one does then not need to significantly change the production plant, or significantly modify the process. Thus, since in recent times. PUFAs have been found to be advantageous in, for example, infant formulas, the PUFAs have been added to the oil phase in existing processes.

It in not until the present invention that it has been restaged that adding the PUFA at such an early stage can have disadvantages, because the PUFA becomes degraded. The invention may therefore provide a solution to the problem of preparing a PUFA-containing foodstuff where the PUFA is subjected to as few as possible degrading stages.

The PUFA can thus be added at a later stage than in a prior art process for the preparation for the foodstuff. This can then minimise the PUFAs exposure to unfavourable conditions. Preferably, the PUFA is added after the drying step in (c). This drying may comprise spray drying.

The foodstuff is preferably one that is suitable for humans, such as babies and/or infants. It may therefore be an infant formula. Such a formula will usually comprise milk. However, the foodstuff may be a milk or milk substitute. The foodstuff can therefore be a powdered milk product.

The foodstuff can be a solid, in which case it is preferably dried, and optimally in the form of a powder. Preferably, it is miscible or dispersible in an aqueous liquid, such as water. Such foodstuffs may therefore produce a milk-like product on addition to water.

The foodstuff can also be in a liquid form (e.g. in the case of an infant formula), which is ready for use, or a concentrated liquid from which can be diluted before use with water. If the foodstuff is a liquid then the drying stage (c) can be omitted.

Alternatively, the infant formula may be a powdered product, in which case this can be added to water. (The resulting liquid composition is often then warmed, e.g. to 35° C., before administration). In a solid form, foodstuff may not only be an infant formula, but may be a milk powder suitable for addition to coffee, tea, chocolate or other such beverages.

The PUFA can be added in a variety of forms. It may be added as part or a component of a liquid or solid composition. If liquid, this may be a lipid composition and/or an oil. The oil may contain solely the PUFA or it may contain a number of other ingredients. If a solid composition is used, the PUFA may, be encapsulated in capsules or it maybe in a powdered form, for example coated onto a solid carrier. For these latter forms reference is made to the copending International patent application filed on the same day as this case, in the name of Gist-brocades B.V., entitled "PUFA coated solid carrier particles for foodstuff", Suitable microencapsulation techniques are, for example, described in WO-A-94/01001.

The PUFA-containing composition, if a lipid, can be an oily liquid. Typically the PUFA can be in the form of a phospholipid, triglyceride, or a mixture thereof. However, the PUFA can also be in the form of a fatty acid or fatty acid ester.

If the composition containing the PUFA is a liquid, then preferably it is an oil. The oil may come from a variety of sources, including vegetable, animal and microbial sources. Vegetables sources include blackcurrant oil. Animal sources include fish oil or egg yolk lipid. Microbial sources are, however, preferred. These include fungal sources, such as a fungus of the order Mucorales. For example, the fungus may belong to the genus Mortierella, such as of the species *Mortirella alpina*. Such organisms can produce arachidonic acid (ARA).

Other microbial sources include algae. The algae may be a dinoflagellate and/or belong to the genus Crypthecodinium. In particular, the algae is *Crypthecodinium cohnii*.

Preferred PUFAs are a C18, C20 C22 ω-3 or a C18, C20 or C22 ω-6 polyunsaturated fatty acid. Preferred are the C20 or the C22 ω-3 or C20 or C22 ω-6 polyunsaturated fatty acids. These include not only arachidonic acid (ARA) but also eicosapentaenoic acid (EPA) end docosahexaenoic acid (DHA). Suitable methods for preparing these PUFAs are disclosed in the copending International application filed on the same day as the present application, also in the name of Gist-brocades B. V., and entitled "Preparation of microbial polyunsaturated fatty acid PUFA, containing oil from a pasteurised biomass".

More than one PUFA can be added. In this case, two or more PUFAs may be from a different source, and therefore one may add either the PUFAs separately (as separate compositions) or mix, the two PUFAs (to give a single composition) before addition during the foodstuff preparation process. For example, fish oil contains DHA which may be mixed with one or more microbial oils containing another PUFA (e.g. ARA).

In the process of the invention it is preferred that the starting oil phase does not contain any PUFAs. This is because they are suitably added later. The drying in (c), which in optional, can be performed by any suitable technique known in the art, although spray drying is preferred. Suitably in (d) the oil and aqueous phases are homogenised after initial mixing. The emulsion so far will usually be an oil in water emulsion.

It is preferred that the source of the PUFA is a microbial oil and/or a fish oil in this came, vegetable oils alone (i.e. not part of a mixture or blend) can be excluded such as maize, soy and/or corn oil. Preferably, the foodstuff will not contain a compound containing 2,2,4-trimethyl-2,2-dihydroquinaline moiety.

The aqueous phase can be thought of as a water-containing phase. It is thus possible for this aqueous phase to be an emulsion, for example a milk or milk product, such as evaporated skimmed or semi-skimmed milk. Thus, the aqueous phase can refer to a substance where the continuous (or bulk) phase is aqueous.

Preferably the PUFA is added immediately after the drying in (c). The drying in preferred embodiments results in a spray-dried powder. The PUFA can then be applied, or added, for example to give a coating of the PUFA onto the spray dried powder. In this case, the PUFA composition is preferably a liquid, such as an oil. This oil may additionally contain lecithin, for example at 0.2 to 0.3%. The composition may therefore be a lecithin/PUFA mixture.

If the PUFA containing composition is an oil, such as a vegetable oil, then it can be used not only to apply the PUFA, but also the lecithin.

A suitable food stuff preparation process, in particular or an infant formula is outlined on page 10.

The point at which the PUFAs are added in prior art processes is shown: this is where the PUFA is added to the oil blend. Also shown in the preferred stage of addition of the or each PUFA according to the present invention, much later on in the infant formula (IF) preparation process.

If the foodstuff is to be a liquid, then the PUFA can be simply added to the liquid that will form the final liquid foodstuff. However, if the foodstuff is to be a solid, for example a powder then preferably the PUFA is added to the powder. Here the PUFA can be sprayed and/or mixed onto the powder. Suitably the PUFA will remain liquid at room temperature, and therefore it can be absorbed on or coated on particles constituting the powder. Here the PUFA will suitably be in a liquid form (that is to say, the PUFA has preferably not solidified. Indeed, suitably the or each PUFA is a liquid at room temperature. Preferably, the PUFA will have a melting point that is from 5° C. to −10° C. In the powder form, the foodstuff preferably has a water content that is less than 5%, and preferably less than 1 or 2% (by weight).

In another embodiment of the intention, the PUFA is present in a "pre-mix". This can be an infant formula constituent additionally containing lactose and whey proteins and optionally vitamins and minerals. This can be added to the powder, that is to become the infant formula, after spray drying.

Preferably in stage (b) after mixing the oil and aqueous phases the resulting mixture is subjected to homogenisation. Here, the mixture can be forced through a small nozzle or hole at high pressure, and suitably at high shear forces. This can be accomplished using any well known technique in the art.

As previously discussed, the preferred method of drying the emulsion, if the foodstuff is to be solid (such as a powder) is by spray drying. Here the emulsion can be reduced to a water content of from 2 to 5%. Spray drying techniques are well known in the art: usually one provides a tower at the top of which is a spinning disk or nozzle onto which or through which the emulsion is passed. This yields (often fine) droplets in the form of a mist or aerosol. The resulting particles are dried at a temperature of 70 or 80° C. to 140° C.

The resulting particles can have an average diameter of from 5 to 1000 $\mu$m, such as from 50 to 250 $\mu$m. Generally speaking it consists of a matrix of the components that were in the aqueous phase, the inside of which are the oil particles that were previously present in the oil in water emulsion.

The resulting particles can be further dried, for example on a fluidised bed. Here, particles may be subjected to hot air, and may be moved either on a conveyer belt or on a vibrating surface. Suitably there is a temperature gradient, such as from 80 to 20° C. The particles can be dried at from 3 to 10 such as from 4 to 6 minutes. Preferably, they will hive a water content of from 0.5 to 6 such as from 1 to 3% by weight.

In a pre-mix some of the spray dried particles can be added to a "pre-mix" of the various components that can be added to infant formula.

The PUFA can then be added. This may be as a liquid or solid (e.g. lipid composition). The PUFA can be added directly after spray drying, during spray drying (if the temperature is lowered) or later at the same time as one or more other ingredients such as vitamins, minerals, trace elements, whey protein concentrate and/or carbohydrates) are added.

For example, the PUFA may be added when the powder is present (e.g. being dried) on a fluidised bed.

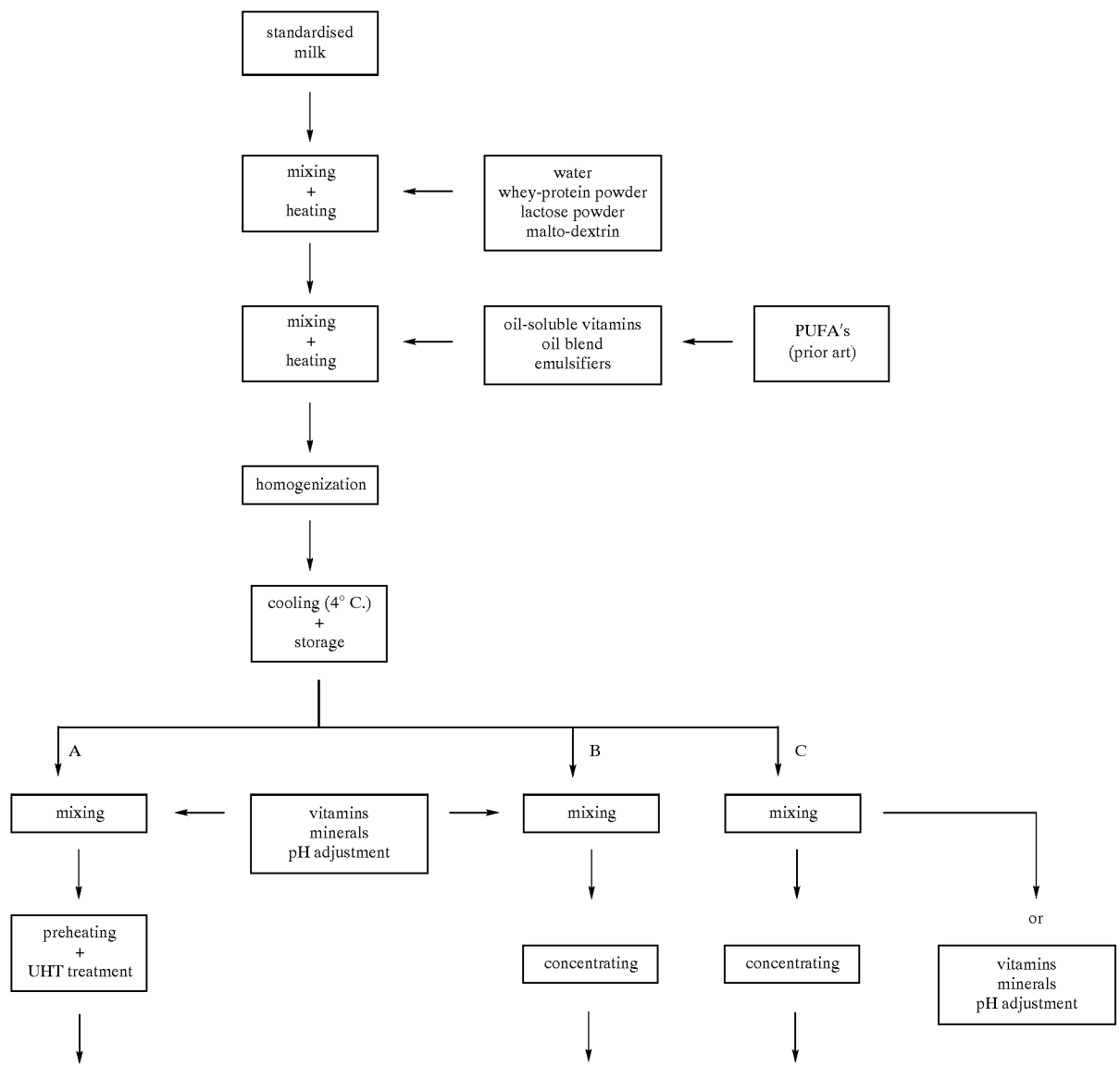

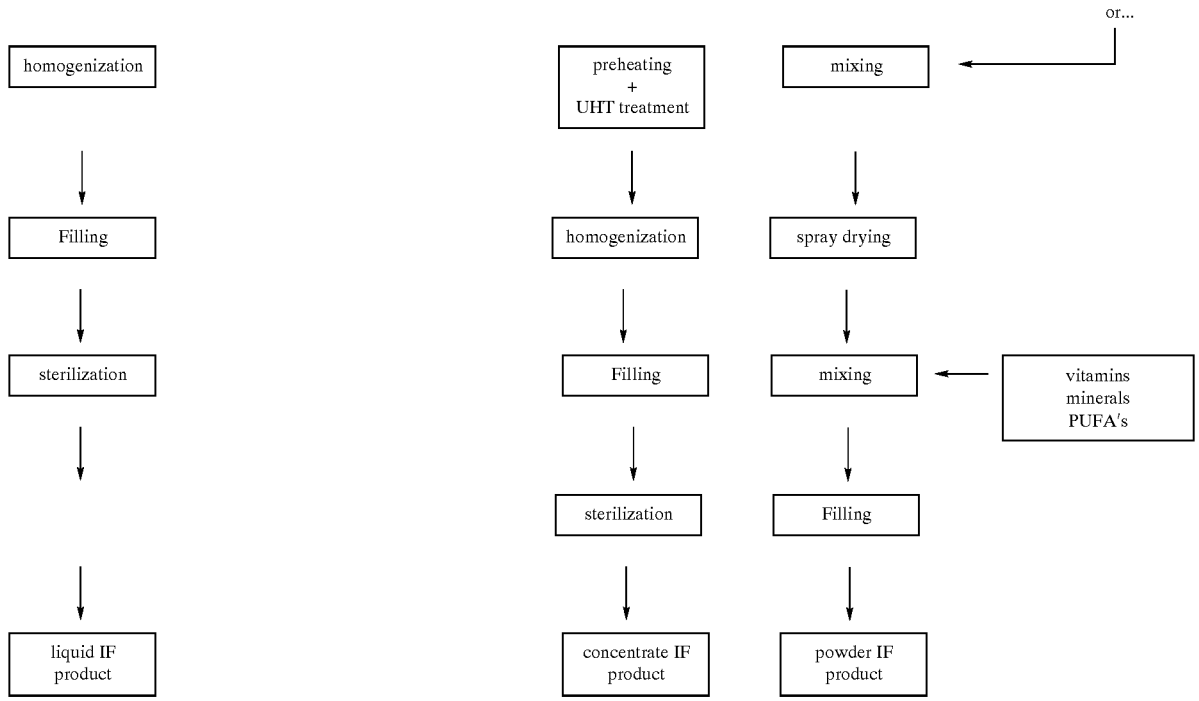

In the prior art the PUFAs are added to the oil blend which is then mixed and heated with other ingredients. This is then homogenised to form an emulsion. The emulsion is then cooled. The various processes then diverge depending on the type of infant formula (IF) product to be produced.

Also shown is when the PUFA is (preferably) added according to the process of the invention. Processes A and B both produce liquid IF products, the latter being a concentrate, suitable for dilution. In both pathways the PUFA is added after homogenisation, but before sterilisation. A PUFA is usually added before the infant formula is added (or filled) into a vessel in preparation for sterilisation.

Taking process C this produces a solid (e.g. powder) IF product, the PUFA is preferably added after the drying stage (referred to as (c) stage previously); again this maybe before the material is added to, or filled, into a vessel. There is no sterilising stage here, since that can be performed after addition of the powdered product to water.

Thus, in a preferred process, the invention in the first aspect comprises:
a) providing an aqueous phase, or a water-containing phase, to which is optionally added other ingredients such as water, whey proteins (usually solids: a by-product of cheese-making), lactose, and/or maltodextrin. All these ingredients can be mixed and/or heated. This phase may in fact be an emulsion, and is preferably derived from milk;
b) providing an oil phase. This phase may contain vitamins and/or emulsifiers. Once added, the oil phase can be mixed and/or heated;
c) mixing the oil and aqueous phase, to form an emulsion: preferably, this is then homogenised;
d) optionally, cooling the (e.g. homogenised) emulsion, which may then be stored;
e) optionally, adding further ingredients such as vitamins, minerals and/or pH adjusters;
f) optionally concentrating the resulting material;
g) if the foodstuff is to be liquid, optionally preheating and/or subjecting to ultra-high temperature (UHT) treatment;
h) optionally homogenising if the foodstuff is to be a liquid, but if the foodstuff is to be a solid, such as a powder, performing drying (such as spray drying);
i) adding one or more PUFA(s) and optionally ingredients such as vitamins and/or minerals;
j) filling a container with the material obtained; and
k) if the material is a liquid, subjecting it to sterilisation.

In a particularly preferred process of the present invention, the foodstuff is prepared as follows:
a) Standardising milk (either pasteurised, skimmed, semi-skimmed or half-fat milk) by addition of whey protein concentrate, minerals, water-soluble vitamins, trace elements and/or carbohydrates. This standardisation is achieved by mixing and/or heating, for example at 50 to 70° C.;
b) Preparing an oil phase, containing an oil (e.g. vegetable) oil, oil-soluble emulsifiers, oil-soluble vitamins and/or antioxidants. These ingredients can be mixed and then preferably heated (to improve mixing), for example at 50 to 70° C.;
c) Mixing the oil phase with the aqueous phase, and optionally heating, so as to form an emulsion;
d) Homogenising the emulsion. This can be performed at an elevated temperature and/or pressure, it may also be performed in one or more steps, such as in two stages. If heating is performed, then this is from preferably at from 50 to 70° C. If elevated pressures are used, then for example in a first stage this is at from 120 to 180 such as from 140 to 160 bar (Atm). In a second stage, the pressure can be at from 15 to 45, such as from 25 to 35 bar (Atm);
e) Cooling the homogenised emulsion. This may be to a temperature of from 3 to 7° C., such as from 4 to 6° C.;

f) Adding to the cooled emulsion other ingredients such as water soluble vitamins, minerals and/or trace elements;

g1) Sterilising the emulsion of (f), such as at ultra high temperatures (e.g. at least 100° C., such as from 110 to 140° C.) if the foodstuff is to be a liquid so that it is sterile; or g2) Pasteurising the emulsion of (f) and drying it (such as by spray drying) in order to give a dried material, such as a spray dried powder (sterilisation here may not be necessary since the water content can be so low that microorganisms will not be able to grow);

h) Adding the or each PUFA, and optionally adding other (usually dry) ingredients, for example vitamins, minerals, trace elements, whey protein concentrate and/or carbohydrates.

As will have been apparent, a number or other various ingredients can be added to the foodstuff. These include sugars, proteins, vitamins, emulsifiers, minerals and/or pH adjusters. In the final foodstuff, the proteins are preferably present at from 0 to 35% by weight, the vitamins can be present at from 0 to 2% by weight, emulsifiers can be present at from 0 to 2% by weight as well, and minerals can be present at from 0 to 3% by weight.

Suitable minerals include calcium lactate, calcium chloride, zinc sulphate and/or copper sulphate. Preferred carbohydrates can include meltodextrin and/or lactose monohydrate.

Vitamins can include water soluble or oil soluble vitamins. Water soluble vitamins can include vitamin $B_1$ (thiamine hydrochloride), vitamin $B_2$ (riboflavin), vitamin $B_6$ (pyridoxine hydrochloride), vitamin $B_{12}$ (cyanocobalamin), folic acid, niacinamide, calcium-D-pantothante, biotin, sodium ascorbate, carnitine (HCl) and/or taurine. Oil soluble vitamins can include vitamin A (acetate), vitamin D (calciferol), vitamin E (tocopherol acetate), vitamin $K_1$ (phytomenadione).

There are four embodiments of the process of the invention which are exemplified. These are the preferred means or adding the PUFA during the preparation process.

The first is that the PUFA is added as a liquid (such as a homogeneous lipid) to the dried material, directly after spray drying, preferably while the dried material is on a fluidised bed.

In a second, the PUFA is again added as a liquid, but this time as an oil in water emulsion. Again, the PUFA can be added directly after spray drying, preferably while the dried material is on a fluidised bed.

Thirdly, the PUFA can be added as a powder: here the PUFA may be absorbed and/or coated onto solid carriers, such as solid carrier particles. Again, the PUFA can be added after the spray drying process, preferably by means of mixing with the dried material, such as in a conventional mixer.

Fourthly, the PUFA can be added as a solid, again as a powder, but here the PUFA is microencapsulated. Again, the PUFA is preferably added after the spray drying process, and may be mixed with the dried material in a conventional mixer.

The invention will now be described by way of example only, with reference to the following examples. These are provided by means of illustration and are not to be construed as being limiting on the invention.

EXAMPLES 1 to 4

Four different infant formula preparation processes were performed. These different methods correspond to the four embodiments described earlier. The type of PUFA composition employed, and how it is produced, are described in Table 1. The mode of addition of the PUFA containing composition, and at what stage in the process it was added, is described in Table 2.

A sensory analysis of the foodstuffs prepared according to the Examples was performed, in particular for taste and smell (olfactory analysis). All the infant formulas made had a good taste and had a neutral smell. These were compared with a prior art process where the PUFA was added to the starting oil blend. The final infant formula from that process gave a bad odour (smelling of fish).

TABLE 1

The Preparation of Liquid and Powdered Lipid Pufa Compositions for Addition in Infant Formula Processes

| Example | type of Pufa composition | type of Pufa oil, supplier<br>concentration Pufa in Pufa oil<br>concentration Pufa and other components<br>in composition | production method for Pufa composition |
|---|---|---|---|
| 1 | lipid composition as homogeneous liquid | fungal Arachidonic acid oil, Gist-brocades Gb<br>40% ARA in Pufa oil<br>27% Pufa oil in lipid composition<br>30% lecithin<br>43% vegetable oil containing natural anti-oxidants | vegetable oil was warmed up till 50° C.,<br>lecithin was added and mixed,<br>Pufa oil was added and mixed,<br>the resulting oily liquid was stored under nitrogen. |
| 2 | lipid composition as oil in water emulsion | fish Docosahexanenoic acid oil (Pronova)<br>30% DHA in Pufa oil<br>10% Pufa oil in lipid composition<br>6% lactose<br>3% sodium caseinate<br>81% water | to water of 45° C. sodium caseinate, lactose and Pufa oil was added,<br>an emulsion is prepared by homogenisation with a Janke Kunkel Ultra Turrax T50 equipped with G45MF rotor/stator at 8000 rpm,<br>the resulting emulsion was stored under nitrogen. |
| 3 | powdered composition as Pufa's adsorbed on solid carrier | fungal Arachidonic acid oil, Gb<br>40% ARA in Pufa oil<br>10% ARA-Pufa oil in lipid composition<br>fish Docosahexenoic acid oil, Nippon<br>20% DHA in Pufa oil<br>10% DHA-Pufa oil in lipid composition<br>80% lactose in lipid composition | a mixture of ARA- and DHA-Pufa oil was prepared and mixed with lactose in a Lodige FM ploughshare mixer by adding the oil with a rate of 10 kg per minute,<br>the resulting powder was packed under nitrogen. |
| 4 | powdered composition as Pufa microcapsules | fungal Arachidonic acid in oil, Gb<br>40% ARA in Pufa oil | ARA- and DHA-microcapsules were prepared separately as follows, |

TABLE 1-continued

The Preparation of Liquid and Powdered Lipid Pufa Compositions for Addition in Infant Formula Processes

| Example | type of Pufa composition | type of Pufa oil, supplier concentration Pufa in Pufa oil concentration Pufa and other components in composition | production method for Pufa composition |
|---|---|---|---|
| | | 20% ARA-Pufa oil in lipid composition<br>77% maltodextrin DE 15<br>3% sodium caseinate<br>fish Docosahexanenoic acid oil, Pronova<br>20% DHA in Pufa oil<br>20% DHA-Pufa oil in lipid composition<br>77% maltodextrin DE 15<br>3% sodium caseinate | in water with a temperature of 45° sodium caseinate and maltodextrin are dissolved, the Pufa oil added and mixed,<br>the mixture was warmed up to 60° C. and homogenized resulting in a oil in water emulsion,<br>the emulsion was spray dried and the resulting microcapsules packed under nitrogen. |

TABLE 2

| Example | type of Pufa composition type of infant formula (IF) | point at which Pufa composition is added to infant formula process | method of addition of the lipid Pufa composition to infant formula process |
|---|---|---|---|
| 1 | lipid composition, homogeneous liquid, term dry instant IF (to be reconstituted, 13 g + 90 ml water) | in fluidized bed, directly after spray drying | a batch of 200 kg dry term IF containing 3 kg of lipid Pufa composition as homogeneous liquid was prepared as follows;<br>to the IF with a dry matter content of 4% the lipid composition with a temperature of 50° C. is sprayed with a rate of 0.5 kg per hour on the moving fluidized IF proceeding through the fluidized bed with a rate of 50 kg per hour, the temperature was set at such a level that finally a loss on drying content of the IF between 1 and 2% is realized |
| 2 | lipid composition, oil in water emulsion, preterm (for infants born early, or before normal term) dry instant IF (to be reconstituted, 13g + 90 ml water) | in fluidized bed, directly after spray drying | a batch of 300 kg dry preterm IF was prepared by adding 13.87 kg of lipid Pufa composition as oil in water emulsion as follows;<br>to the IF with a loss on drying content of 2% the lipid composition was sprayed with a rate of 2.3 kg per hour on the moving fluidized IF proceeding through the fluidized bed with a rate of 50 kg per hour, the temperature set at such a level that finally a loss on drying content of the IF between 1 and 2% was realized |
| 3 | powdered composition, Pufa adsorbed on solid carrier term dry instant IF (to be reconstituted, 13 g + 90 ml water) | in mixer, after the spray drying process | a batch of 1000 kg dry term IF containing 27 kg of lipid Pufa composition as Pufa's adsorbed on a carrier was prepared as follows;<br>premix was prepared containing 27 kg lipid Pufa composition, the necessary amounts of vitamins and minerals and lactose to a total amount of 200 kg, the premix is added to 800 kg of spray dried IF and mixed in a conical Nauta 50RX mixer. |
| 4 | powdered composition, Pufa microcapsules pre term instant IF (to be reconstituted, 13 g + 90 ml water) | in mixer, after the spray drying process | a batch of 3000 kg dry preterm IF containing 182 kg of lipid Pufa composition as microcapsules divided in 78 kg ARA-microcapsules and 104 kg DHA-microcapsules was prepared as follows;<br>a premix was prepared containing 182 kg lipid Pufa composition, the necessary amounts of vitamins and minerals and lactose to a total amount of 600 kg, the premix was added to 2400 kg of spray dried IF and mixed in a conical Nauta 100RX mixer. |

What is claimed is:

1. A process for preparing a foodstuff suitable for humans which is a liquid or a solid powder and dispersible in water, the food stuff comprising a polyunsaturated fatty acid (PUFA) but being free of capsules containing both a PUFA and an immunoglobulin, the process comprising steps (a)–(g) in the following order:
   (a) providing an oil phase and an aqueous phase;
   (b) mixing the oil and aqueous phases to form an oil-in-water emulsion;
   (c) treating the emulsion to homogenisation or heating;
   (d) drying the emulsion to form a powder;
   (e) adding at least on PUFA to the powder;
   (f) using the material resulting from (e) to prepare a foodstuff; and
   (g) adding to, or filling, a vessel with the resulting PUFA-containing foodstuff.

2. A process of claim 1 wherein the PUFA when added is in a lipid composition.

3. A process of claim 1 wherein the PUFA when added is a solid powder lipid composition.

4. A process of claim 1 wherein the oil-in-water emulsion in step (b) is formed by homogenisation.

5. A process of claim 1 wherein the foodstuff is an infant formula.

6. A process of claim wherein the PUFA is a C18, C20 or C22 ω-3 or ω-6 PUFA.

7. A process of claim 1 wherein the PUFA is arachidonic acid (ARA), docosahexaenoic acid (DHA) or eicosapentaenoic acid (EPA).

8. A process of claim 1 wherein the PUFA is from a Microbial oil and/or a fish oil.

9. A process of claim 1 comprising:
a) providing an aqueous phase comprising whey protein and which comprises, or is derived from, milk;
b) providing an oil phase comprising one or more vitamins and/or emulsifiers;
c) mixing the oil and aqueous phases to form an emulsion, and homogenising the emulsion;
d) cooling the homogenised emulsion;
e) subjecting the emulsion to UHT treatment; and
f) adding one or more PUFAs and optionally one or more vitamins and/or minerals.

10. A process of claim 1 further comprising adding one or more vitamins to the emulsion after step (d).

11. A process of claim 1 further comprising concentrating the material resulting from step (d).

12. A process of claim 1 further comprising drying the material resulting from step (e) to form a powder before step (f).

* * * * *